Patented Dec. 14, 1948

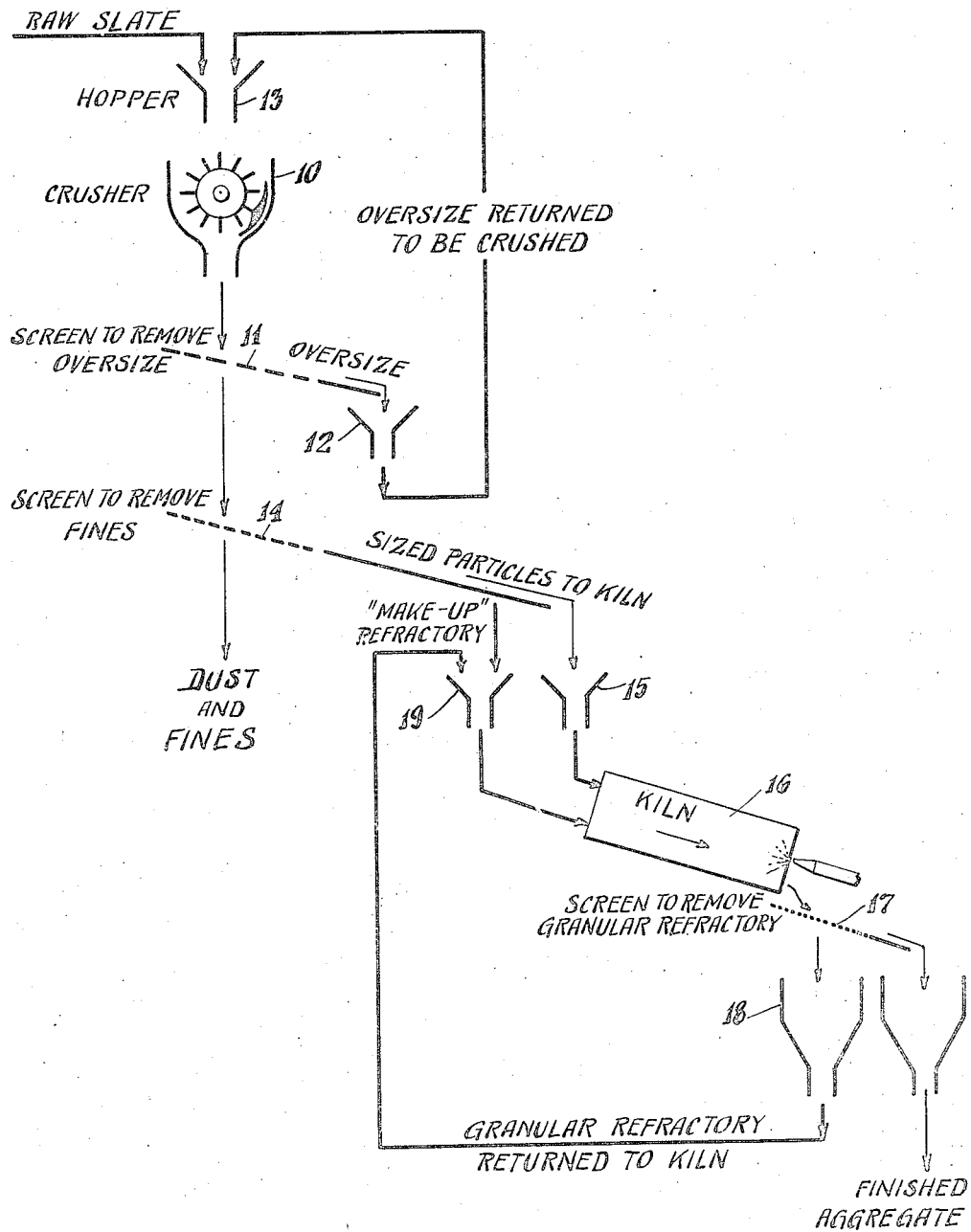

2,456,207

UNITED STATES PATENT OFFICE 2,456,207

LIGHTWEIGHT AGGREGATE AND METHOD OF PRODUCING SAME

Walter J. McCoy, Catasauqua, Pa., assignor to Lehigh Portland Cement Company, Allentown, Pa., a corporation of Pennsylvania Application August 2, 1946, Serial No. 687,903

11 Claims. (Cl. 252—378)

This invention relates to lightweight aggregate for use in concrete or other building material and to a method of making such aggregate.

The aggregates used for concrete and similar building material may be classified generally into heavy and lightweight types. The heavyweight type includes natural sands, gravels and crushed stones. Ordinary concrete usually contains this type aggregate and weighs around 150 pounds per cubic foot. Stress calculations in a given structure must take into account this high unit weight and therefore require the structure to be stronger than would otherwise be necessary to carry the dead load of the concrete. Lightweight aggregates, on the other hand, may be used with the result that the concrete is lighter per unit volume and if adequate strength is provided there is a saving in the amount of concrete required to carry the stresses. Concrete weighing considerably less than 100 pounds per cubic foot and having adequate strength may be produced with aggregate made according to this invention.

Lightweight aggregates have heretofore been made from shales or clays when containing sufficient initially present or added quantities of sulphur, iron or carbonaceous matter to cause vesiculation upon heating. There have been various processes suggested for the production of lightweight aggregate based upon this reaction. These processes, however, involved a number of operations, first in preparing the raw material then a burning or heating operation followed by crushing and screening operations. In some of these processes the material was ground and then made into a plastic mass, pugged, extruded and then shaped to desired sized particles. That is, the plastic mass was pelletized. The pellets were then heated to cause them to expand or vesiculate. The pellets while moist were coated with a refractory material before heating or during heating and this formed a shell on the finished expanded particles. The drawback in such process is that when the pellets are heated the refractory becomes fused and adheres to the outside of the pellets to form a shell and this tends to defeat the primary object of producing a lightweight aggregate because the refractory being heavier than the vesiculated part of the particle adds concomitant weight to the aggregate. Nevertheless it was suggested that refractory material be used to coat the pellets because otherwise upon heating the pellets to a temperature sufficiently high to cause the desired vesiculation, they became fused together in agglomerates. In this case the agglomerates had to be broken down with the result that there was a loss of fines due to the crushing. Also, this left the finished aggregate with sharp corners and rough porous surfaces which are undesirable.

Other lightweight aggregates have been available such as crushed and sized clinker, or slag and the like, but these have the disadvantage of sharp corners and exposed pitted areas. These characteristics are undesirable because they are detrimental to the workability of the concrete mix and increase the water requirement, and it is well known that excess water has a deleterious effect on the strength of concrete.

The ideal lightweight aggregate therefore appears to be one in which the discrete particles are vesiculated and of desired size or range of size and with few, or practically no, sharp corners or exposed pitted areas on the surface. At the same time the aggregate should have adequate structural strength although vesiculated to an extent sufficient to give the desired lightness of weight.

It is an object of this invention to produce a lightweight aggregate having those desired characteristics and approaching the ideal in manner and to an extent not heretofore attained in prior art practices.

According to this invention the raw material need not be ground to produce a fine material which must be pugged and pelletized before vesiculation. On the contrary, the invention utilizes a raw material which is readily broken down to a desired size which can be vesiculated according to the method hereinafter described without intermediate pelletizing and the process is such that the product resulting from the heating or vesiculation step is in the form of discrete particles within the desired size range ready for use as lightweight aggregate without having to be further crushed, graded or sized. Thus, the invention eliminates a number of steps which were necessary according to prior practices.

Slate is the raw material from which the lightweight aggregate is produced in accordance with the invention. It contains naturally the constituents which cause it to vesiculate when properly heated. Also, it is a particularly desirable material because of the available source, there being vast quantities of it which have already been quarried. Much slate now lies on waste piles because this slate did not lend itself to mechanical separation into large thin laminated sections required for the customary slate market, or for some other reason. In any event, there are many such slate piles in readily accessible places and this invention lends itself admirably to the utilization of this rejected material heretofore considered as waste.

There have been suggestions that slate be used for making an aggregate for concrete but so far as I am aware these prior suggestions have either failed completely or have had drawbacks which are overcome by the process of this invention. One of the difficulties that has not heretofore been successfully overcome arises out of the inherent characteristics of the slate itself taken together with the nature of steps which normally suggest themselves as necessary to the production of a vesiculated or expanded slate aggregate. Since it is necessary to heat the broken up slate to cause it to vesiculate, it must be heated to sufficient degree and for sufficient time to obtain sufficient vesiculation to produce the desired lightness of weight. If it is heated sufficiently to obtain the required lightness this results in a fusion of the particles together, forming agglomerates which have to be broken up later and this results in disadvantages mentioned above. On the other hand, if a temperature low enough to prevent fusion to eliminate agglomeration, is utilized in the heating step, then the resultant product is not expanded sufficiently to produce the desired lightness and the particles also do not have the undesirable sharp corners rounded off.

It is a further object of this invention to overcome these drawbacks whereby the slate particles which are ultimately to form the discrete particles of the expanded slate aggregate may be heated to a high enough temperature to vesiculate the particles to desired lightness and at the same time to fuse the surface sufficiently to round off undesirable sharp angular corners while at the same time undesirable fusion, so as to cause the particles to adhere together and form undesirable agglomerates, is avoided.

To accomplish these desirable ends, and others mentioned hereinafter, the invention contemplates a process whereby slate is subjected to a crushing so as to produce discrete raw or unburned slate particles ranging in size up to about one-half of an inch in its longest dimension, or larger if desired, it being understood, of course, that the raw slate is ordinarily laminated or in relatively thin pieces. Dust and extreme fines from this crushing operation are preferably, although not necessarily, removed and the pre-sized raw slate particles are then subjected to a heating operation in a suitable kiln through which the particles are moved and meanwhile subjected to sufficient heat for sufficient time to vesiculate the particles to the desired degree when incipient fusion also takes place resulting in a rounding off of sharp corners. When necessary to prevent the particles from fusing or adhering together during the heating operation, there is mixed with the raw pre-sized slate particles either before charging the particles to the burning kiln or during their passage therethrough, a material which serves to prevent the particles from adhering together but which will not adhere to the vesiculated particles to a sufficient extent to substantially increase the weight of the cooled vesiculated aggregate particles in case a particularly strong lightweight aggregate is desired. The material caused to be present with the slate in order to prevent undesirable adhesion of the particles, one to another, during the heating should be one that is granular in form and refractory in nature and one that has a fusion temperature well above that of the slate itself. When the slate particles are heated in the presence of such material to a temperature and for sufficient time to produce a moderate amount of expansion, the material should be such that upon relatively rapid cooling of the heated slate after vesiculation only a small amount of the granular refractory material will remain adhering to the particles.

Although the novel features which are believed to be characteristic of the invention will be pointed out in the annexed claims, the invention itself as to its objects and advantages and the manner in which it may be carried out may be better understood by reference to the following description taken in connection with the accompanying drawings forming a part hereof, in which there is shown a typical flow diagram representative of the process of the invention. It will be understood that the flow sheet is diagrammatic.

Referring to the flow sheet as representing the manner of practising the invention, the slate, if the pieces are initially too large, is first reduced to the desired size for burning in a kiln. This may be done in a hammer mill or jaw crusher represented in the flow sheet at 10, although the crushing may be accomplished by other types of crushing devices. The slate from the crushing device is discharged onto a screen 11 from which the oversize is passed to an oversize bin 12. The oversize is returned to the crusher charging hopper 13 along with new charge of raw slate. The screen 11 is of a mesh which will permit the desired size for burning to pass through. The larger the size of the particles which are charged to the burning kiln, the larger correspondingly will be the size of expanded particles of the finished product.

I have found that unburned particles up to about one-half inch are well adapted to the process and produce an excellent lightweight aggregate although the particles may be larger, if desired, ranging up to about an inch. Assuming a screen 11 with a mesh suitable to pass particles up to about one-half inch, then all particles of less size (—½") will pass through the screen and are discharged to another screen 14 which has a fine mesh, of the order of 6 to 8 mesh, so that dust and extreme fines pass through and are removed.

The raw slate in the form of particles which do not pass through screen 14, that is, a range in sizes up to about one-half inch, forms the kiln charge, it being understood that the dust and extreme fines are preferably removed. If a larger size charge for the kiln is desired the mesh of screen 11 may be correspondingly increased. Under usual circumstances the size should not exceed an inch.

It is preferable not to give the slate a crushing which is too severe as drastic crushing tends to produce larger quantities of undesirable dust and extreme fines. A less drastic crushing is desirable as this has a tendency to produce more particles of the order of one-half inch to No. 8 mesh passing to screen 14 and it is an easy matter to return oversize collected in the bin 12 and return it to the crusher for further crushing.

The presized particles of slate from the screen 14 which have been freed of dust and extreme fines are passed to a kiln charging hopper 15 from which they may be fed into a rotary kiln 16. This may be the type of rotary kiln known and used for the burning of cement and I have used the rotary type of kiln with good results. However, other types of kilns may be adapted for burning the pre-sized slate particles.

Along with the pre-sized slate particles charged to the rotary kiln 16 there is also fed to the kiln the refractory granular material, having the characteristics mentioned in the foregoing. This material, for convenience of description, may be called an "anti-adhesion" agent. As pointed out above, the "anti-adhesion" agent should be granular and have a substantially higher fusion temperature than the slate particles themselves. I have found a good grade of silica sand gives excellent results although other granular material having like characteristics, such as diatomaceous earth, fire clay and the like may be used.

When sand is used according to the process described herein the resulting aggregate may be highly vesiculated and sharp corners existing on the slate particles may be fused and rounded out without fusing of the sand or "anti-adhesion" granules inter se.

The anti-adhesion agent (herein referred to as sand for convenience of description) is fed from the sand hopper 19 to the kiln 16 along with the pre-sized slate particles or, if desired, the same may be intermixed with the slate charge before it is fed into the kiln, when using a rotary kiln of the kind mentioned because the rotation of the kiln causes an intermixing of sand and slate as the charge tumbles in characteristic fashion and passes down the inclined rotary kiln.

The charge is passed through the rotary kiln in the directions indicated by the arrow in the kiln of the flow sheet, counter-current to the flame gases, during which time the charge is subjected to a temperature between 1850° to 2250° F. A temperature of approximately 2100° F. ordinarily is best suited to produce the desired expansion or vesiculation of the particles. The burned particles are discharged at the lower end of the kiln, and passed onto a screen 17 of small mesh. The hot expanded aggregate discharged from the kiln is cooled and substantially all of the sand in the charge passes through screen 17 and is collected in the sand bin 18 from which it may be returned to the sand hopper 19 along with "make-up" sand to be recirculated through the kiln with further slate particles being vesiculated.

While the reaction is one of time and temperature and these may have to be varied within limits depending upon variations in the particular charges being burned, I have found that the desired results may be obtained by maintaining the kiln temperature between 1850° and 2250° F. and subjecting the charge to a temperature preferably about 2100° F. for a sufficient time to cause incipient fusion at the surface of the slate particles while at the same time causing the particles to expand to three to six times their original size. The expansion which takes place is mostly in a direction at right angles to the cleavage planes of the slate.

I have obtained excellent results by burning the charge as described herein in a rotary kiln at about 2050° to 2100° F. for about twenty minutes while tumbling the charge of slate particles through the kiln with ten to twenty percent of silica sand by weight of the slate to keep the slate particles from fusing together during the burning or vesiculation operation. With a charge made up from a slate quarried from the mines of eastern Pennsylvania, in which the unburned slate particles ranged in size up to about one-half inch, the aggregate treated as above described was discharged from the kiln without agglomeration and on cooling substantially none of the added sand adhered to the vesiculated slate particles. The particles were vesiculated throughout, and were free from sharp corners as the surfaces had been sufficiently fused to round them off, and the particles ranged in size up to the order of about three-fourths inch in longest dimension. The resulting expanded aggregate weighed thirty to thirty-two pounds per cubic foot, according to vibrated weight procedure customarily followed in aggregate testing.

A concrete made with an expanded slate aggregate produced according to the above-mentioned procedure using a 1:2:3½ mix (cement : "sand" : expanded slate aggregate) and containing 6.4 sacks of cement per cubic yard, had a weight of 85 lbs. per cubic foot in air dried condition, a compressive strength of 1880 p. s. i. at seven days and a compressive strength of 3380 p. s. i. at twenty-eight days. The "sand" used in this case was produced by crushing some of the expanded slate aggregate to sand size. For a similar mix when regular silica sand was used in mixing the concrete, the concrete had a weight of 92 lbs. per cubic foot in air dried condition, a compressive strength of 2160 p. s. i. at seven days and a compressive strength of 3540 p. s. i. at twenty-eight days. It may be noted here that sand used for mixing the concrete is not to be confused with the term sand used as an anti-adhesion agent during the vesiculation step.

Light weight concrete is frequently used for floor and roof fills, in which case high strength is not necessary and the cement content can be considerably reduced. A concrete mixture of this type in the proportions of 1:3:4¾ (cement : ground water-cooled slag : expanded slate aggregate) and containing 4.6 sacks of cement per cubic yard had a weight of 88 lbs. per cubic foot in air dried condition, a compressive strength of 900 p. s. i. at 7 days and of 1725 p. s. i. at twenty-eight days.

Lighter weight concrete of this type has good insulation properties, and this can be produced by selection of suitable fine expanded slate aggregate produced according to my process. A mixture in this category in the proportions of 1:3:4¾ (cement:calcined diatomaceous earth: expanded slate aggregate) and containing 4.9 sacks per cubic yard had a weight of 64.8 lbs. per cubic foot in air dried condition, a compressive strength of 1445 p. s. i. at seven days and of 1895 p. s. i. at 28 days.

If it is desired to produce an aggregate vesiculated to a greater degree and therefore lighter in weight, this may be done by subjecting the pre-sized particles charged to the kiln to a higher temperature for the same time or a longer time at a given temperature within the temperature range of 1850°–2250° F. However, there are critical factors which enter into the manipulation of the process. If the charge is permitted to become fused too much there is a tendency for the sand of such "anti-adhesion" agent as is used, to become permanently fused to the particles. Consequently there is a balance or compromise which should be taken into account. If the sand adheres to the expanded particles of slate this has a tendency to increase the weight. However, as the expansion or vesiculation is increased the apparent density of the particles is decreased but increased expansion has a tendency to reduce structural strength. If desired, the particles may be subjected to the time-temperature reaction in the kiln so that the slate particles are expanded to sufficient degree that notwithstanding the added weight attributable to added refractory material, the weight of the resulting finished aggregate may be less than an aggregate which has been produced by subjecting it to a lesser time-temperature reaction whereby substantially none of the refractory material adheres to the particles. However, such aggregate, if "over-expanded," is lacking in high structural strength, and it is not desirable for concrete which must have such strength. Nevertheless, such aggregate is adapted for many uses, such, for example, as a filler for sub-floors and roofs, or where insulation value rather than high structural strength is desired.

It is thus seen that the invention provides a process capable of producing a wide variety of expanded slate aggregate and the process eliminates a number of operations which were necessary to the production of lightweight aggregates in prior art practices. While some variation in temperature or time may be required and by reason of the varying nature of the kiln charge some trial may be necessary in order to produce an aggregate having precise characteristics of apparent density and weight, nevertheless an aggregate of desired characteristics may be produced with the temperature range of 1850° to 2250° F. which appears to be the critical range, and ordinarily a temperature in the neighborhood of 2100° F. with a time reaction of about twenty minutes will produce a satisfactory result. It will be understood, however, that these factors may be varied to suit particular situations at hand and these will be dependent largely upon the characteristics desired in the finished product.

As examples of aggregates produced according to the process of the invention wherein the kiln charge in each instance was made up of minus one-half (—½") inch slate particles and about 20% by weight of silica sand, the resulting aggregate from one such charge when subjected to a temperature in a rotary kiln approximately 2050° to 2100° F. for about twenty minutes, weighed 30 to 32 pounds per cubic foot and was substantially free of adhering sand; another charge when subjected to a temperature approximating 2100–2135° F. for about 20 minutes was expanded more and had a weight of about 28 pounds per cubic foot but also had permanently adhering thereto a small amount of sand which added concomitantly to the weight yet the sand particles were not fused inter se; and a third charge when subjected to a temperature approximating 2135° to 2170° F. for about 20 minutes was expanded more than the second charge mentioned above, but also had a considerable quantity of sand adhering to the particles and had a weight of about 26 pounds per cubic foot but the sand granules were not fused inter se; and a fourth charge subjected to a temperature approximating 2170°–2200° F. for about 20 minutes resulted in an even greater expansion of the particles but had more sand permanently adhering thereto and had a weight of 24 pounds per cubic foot, but the structural strength was too low for use in a concrete requiring high strength. The foregoing examples are indicative to show the nature of the process and to show how the process may be manipulated to best advantage.

It will thus be apparent from the preceding disclosure that the invention provides a simple process of producing a lightweight aggregate which eliminates a number of operations which prior practices required, and the discrete particles may be vesiculated substantially uniformly throughout and they may be caused to be free of surface cracks and jagged projections, yet at no time is the aggregate pulverized either before or after vesiculation. The raw materials are economical to use and a wide variety of light aggregates of desirable characteristics may be made from an otherwise wasted product. While it is in most instances highly important to vesiculate the slate charge in the presence of an anti-adhesion agent, it may not in some instances be necessary. Where all the benefits of this now preferred practice are not necessary or desirable, the vesiculation step might be carried out in the absence of such agent. Also, in some instances, the quantity of anti-adhesion agent may be varied. However, if larger quantities are used it results in less efficient operation as the heating of the excess requires more fuel without corresponding increase in quality of finished aggregate.

The terms and expressions which have been employed herein are used as terms of description and not of limitation and there is no intention in the use of such terms and expressions of excluding any equivalent of the features shown and described or portions thereof, but it is recognized that various modifications are possible within the scope of invention claimed.

What is claimed is:

1. A lightweight aggregate suitable for making concrete which comprises discrete particles of expanded vesiculated burned unpulverized slate particles substantially all of which are less than one inch in longest dimension, said discrete particles being substantially free from sharp angular corners and exposed pitted surfaces, said aggregate weighing not substantially more than thirty-five pounds per cubic foot.

2. A lightweight aggregate made from pre-sized slate pieces suitable for making concrete which aggregate comprises discrete vesiculated slate particles expanded three to six times their initial size, substantially all of said expanded particles ranging in size up to the order of three-fourths inch in longest dimension, said particles having initially contained sharp corners fused and rounded off and having surfaces substantially free from cracks, jagged projections and exposed pitted areas, said aggregate weighing less than thirty-five pounds per cubic foot.

3. A light weight aggregate made from presized unpulverized raw slate particles and suitable for making concrete which comprises discrete particles of expanded vesiculated burned unpulverized slate particles substantially all of which are less than an inch in longest dimension, said discrete particles being expanded three to six times their initial size and substantially free from sharp angular corners and exposed pitted surfaces and weighing less than thirty-five pounds per cubic foot.

4. A method of producing a lightweight aggregate suitable for making concrete which comprises burning presized slate particles in a kiln in the presence of a coarse silica sand material capable of preventing adhesion of said particles when said particles are heated high enough to fuse while agitating the particles for a sufficient time and at a temperature sufficiently high to expand and vesiculate the particles and to cause sufficient fusion of the particles to round off existing sharp corners and removing the expanded particles from the kiln as a lightweight aggregate in the form of discrete particles substantially free of agglomerates.

5. A method of producing a lightweight aggregate the discrete particles of which are substantially free from jagged projections which comprises burning a charge of presized slate particles in a kiln while tumbling the particles in the presence of silica sand while subjecting the charge to a temperature between 1850° F. and 2250° F. and for a time sufficient to vesiculate the slate particles and to fuse and round off sharp corners that may be present in the charged particles but insufficient to cause substantial fusion inter se of the grains of silica sand.

6. A method of producing a light weight and vesiculated slate aggregate suitable for making concrete which comprises providing unburned presized particles substantially free from pulverulent fines ranging in size up to a length of the order of one-half inch, tumbling the said particles in a kiln in the presence of silica sand while subjecting the charge of slate and sand to a temperature between 185° F. and 2250° F. for a length of time sufficient to vesiculate the slate particles and expand them three to six times their initial size without causing a substantial amount of said sand to become permanently fused to the expanded particles so produced.

7. A method of producing a light weight and vesiculated slate aggregate suitable for making concrete which comprises providing unburned presized particles substantially free from pulverulent fines ranging in size up to a length of the order of one-half inch, tumbling the said particles in a kiln in the presence of silica sand in the amount of 10% to 20% by weight of the slate charge while subjecting the charge of slate and sand to a temperature of about 2100° F. for about twenty minutes to vesiculate the slate particles and expand them three to six times their initial size without causing a substantial amount of said sand to become permanently fused to the expanded particles so produced.

8. A method of producing a light weight aggregate suitable for making concrete which comprises providing a charge of presized raw slate particles, substantially free of pulverulent fines, substantially all of the particles of which are of a size less than the order of one-half inch in longest dimension, passing the charge through a kiln maintained at a temperature between 1850° F. to 2250° F. while tumbling the charge in the kiln in the presence of a granular silica sand refractory material having a fusion temperature higher than the slate charge and in sufficient amount to prevent agglomeration of said particles and maintaining the charge in said kiln for sufficient time to vesiculate and expand the slate particles three to six times their initial size.

9. A method of producing a light weight aggregate suitable for making concrete which comprises providing a charge of presized raw slate particles, substantially free of pulverulent fines, substantially all of the particles of which are of a size less than the order of one-half inch in longest dimension, passing the charge through a kiln maintained at a temperature between 1850° to 2250° F. while tumbling the charge in the kiln in the presence of silica sand in sufficient amount to prevent agglomeration of said particles and maintaining the charge in said kiln for sufficient time to vesiculate and expand the slate particles three to six times their initial size.

10. A method of producing a light weight aggregate suitable for making concrete which comprises providing a charge of presized raw slate particles, substantially free of pulverulent fines, substantially all of the particles of which are of a size less than the order of one-half inch in longest dimension, passing the charge through a rotary kiln maintained at a temperature of about 2100° F. while tumbling the charge in the kiln in the presence of 10% to 20% of silica sand by weight of the slate charge and maintaining the charge of slate and sand in said kiln for about twenty minutes to vesiculate and expand the slate particles three to six times their initial size.

11. A method of producing a light weight aggregate suitable for making concrete which comprises providing a charge of presized raw slate particles, substantially free of pulverulent fines, substantially all of the particles of which are of a size less than the order of one-half inch in longest dimension, passing the charge through a rotary kiln maintained at a temperature between 1850° and 2250° F. while tumbling the charge in the kiln in the presence of 10% to 20% of silica sand by weight of the slate charge and maintaining the charge of slate and sand in said kiln for sufficient time to vesiculate and expand the slate particles three to six times their initial size, thereby to produce a light weight vesiculated slate aggregate weighing less than thirty-five pounds per cubic foot, substantially all the particles of which are less than the order of three fourths inch in longest dimension and free from jagged projections and exposed porous surface areas.

WALTER J. McCOY.

REFERENCES CITED

The following references are of record in the file of this patent:

UNITED STATES PATENTS

| Number | Name | Date |
| --- | --- | --- |
| 930,801 | Senn et al. | Apr. 1, 1909 |
| 2,021,956 | Gladney | Nov. 26, 1935 |
| 2,103,746 | Guth | Dec. 28, 1937 |
| 2,199,046 | Evenstad | Apr. 30, 1940 |
| 2,265,358 | Denning | Dec. 9, 1941 |

OTHER REFERENCES

Chemical Abstracts, vol. 25, page 3147, Shablukin, et al.; ibid., vol. 36, page 3925, Platzmann.

Certificate of Correction

Patent No. 2,456,207.                                                                December 14, 1948.

WALTER J. McCOY

It is hereby certified that error appears in the printed specification of the above numbered patent requiring correction as follows:

Column 9, line 20, claim 6, for "185° F." read *1850° F.*;

and that the said Letters Patent should be read with this correction therein that the same may conform to the record of the case in the Patent Office.

Signed and sealed this 12th day of April, A. D. 1949.

[SEAL]

THOMAS F. MURPHY,
*Assistant Commissioner of Patents.*